Nov. 6, 1951 G. JAEGER 2,574,184
SEALING MEANS FOR AN END-LOADING
TRANSIT MIXER OR AGITATOR
Filed June 1, 1951 3 Sheets-Sheet 1
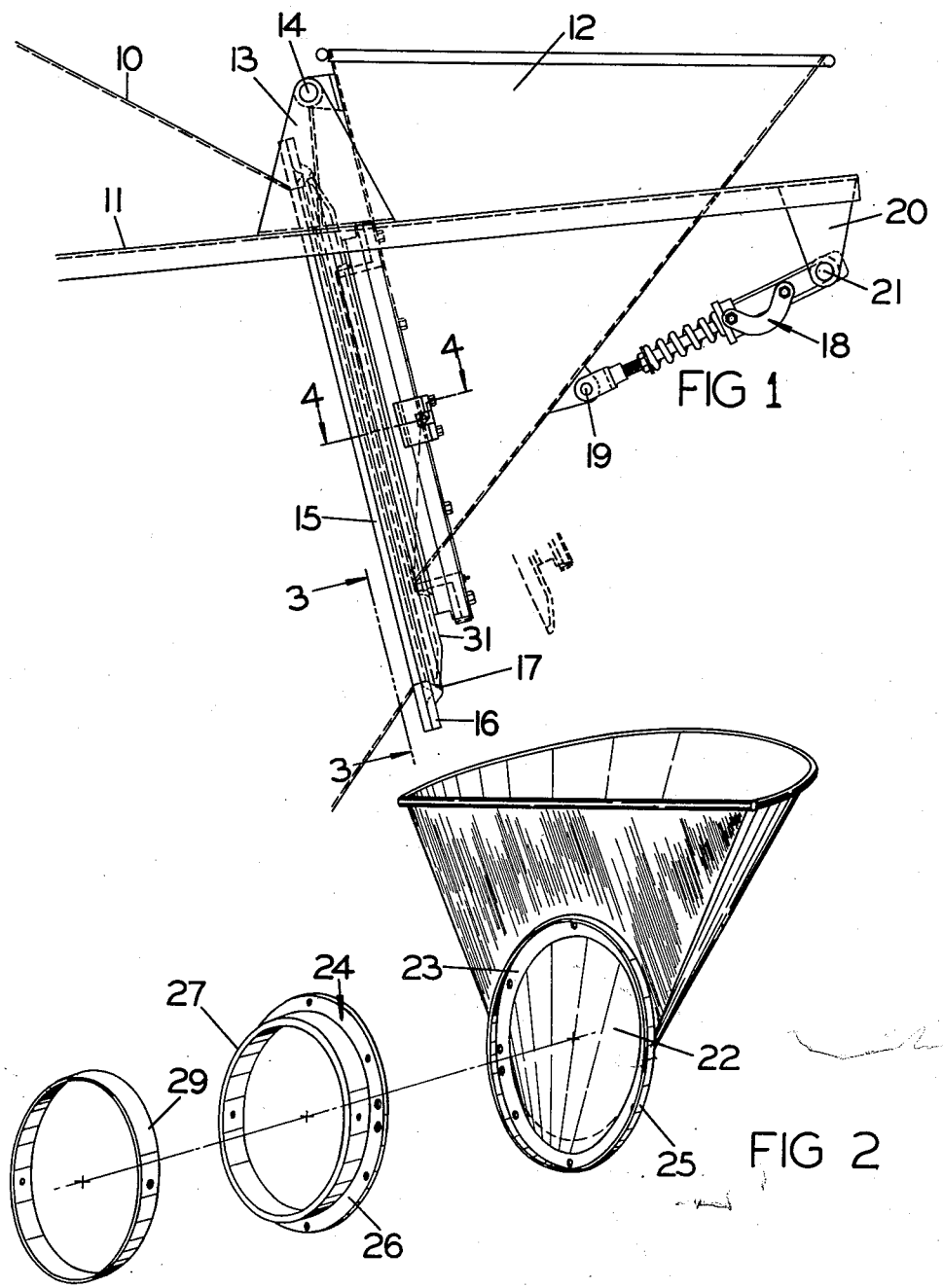
INVENTOR.
GEBHARD JAEGER
BY
ATTORNEYS

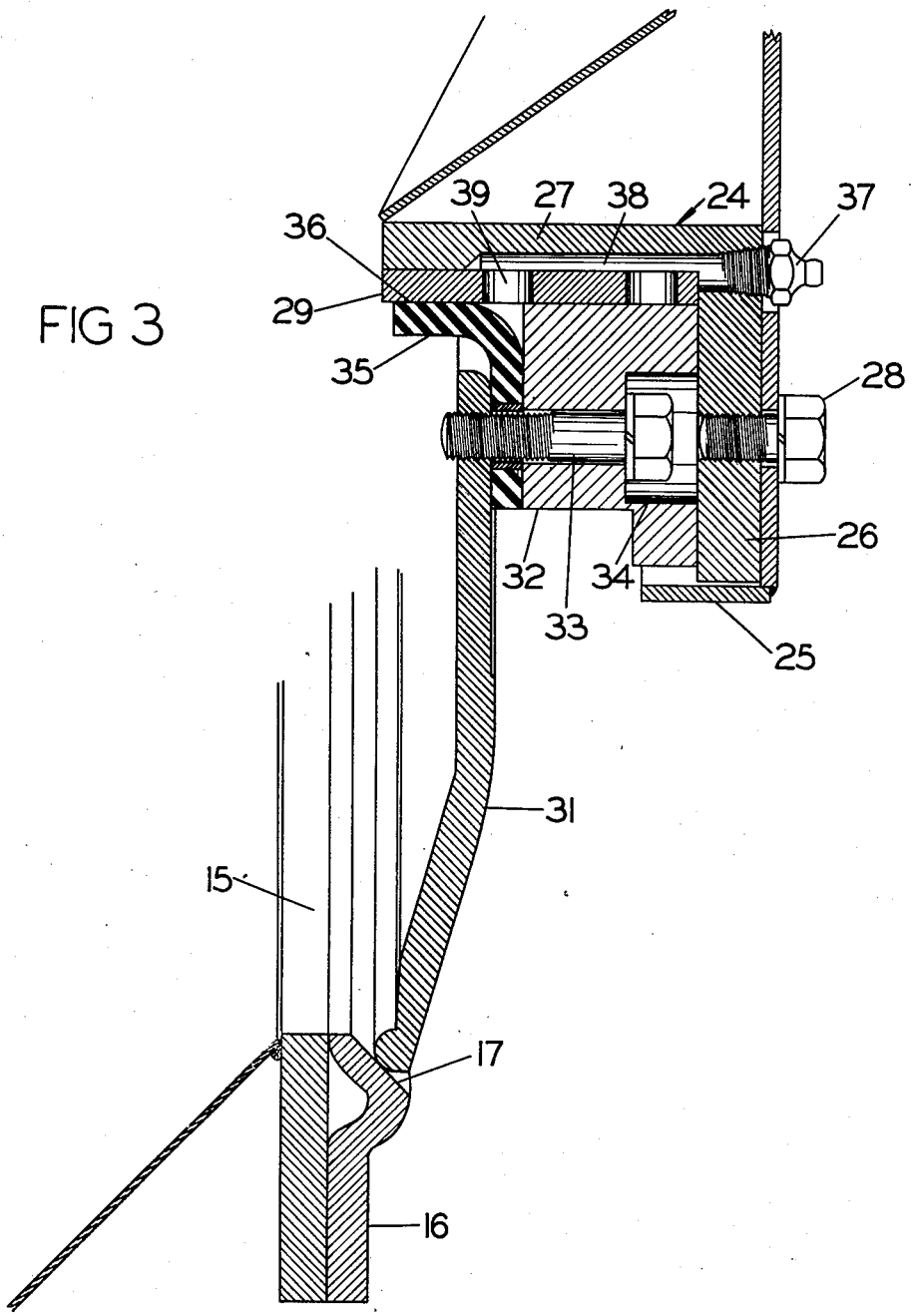

Nov. 6, 1951     G. JAEGER     2,574,184
SEALING MEANS FOR AN END-LOADING
TRANSIT MIXER OR AGITATOR
Filed June 1, 1951     3 Sheets-Sheet 3
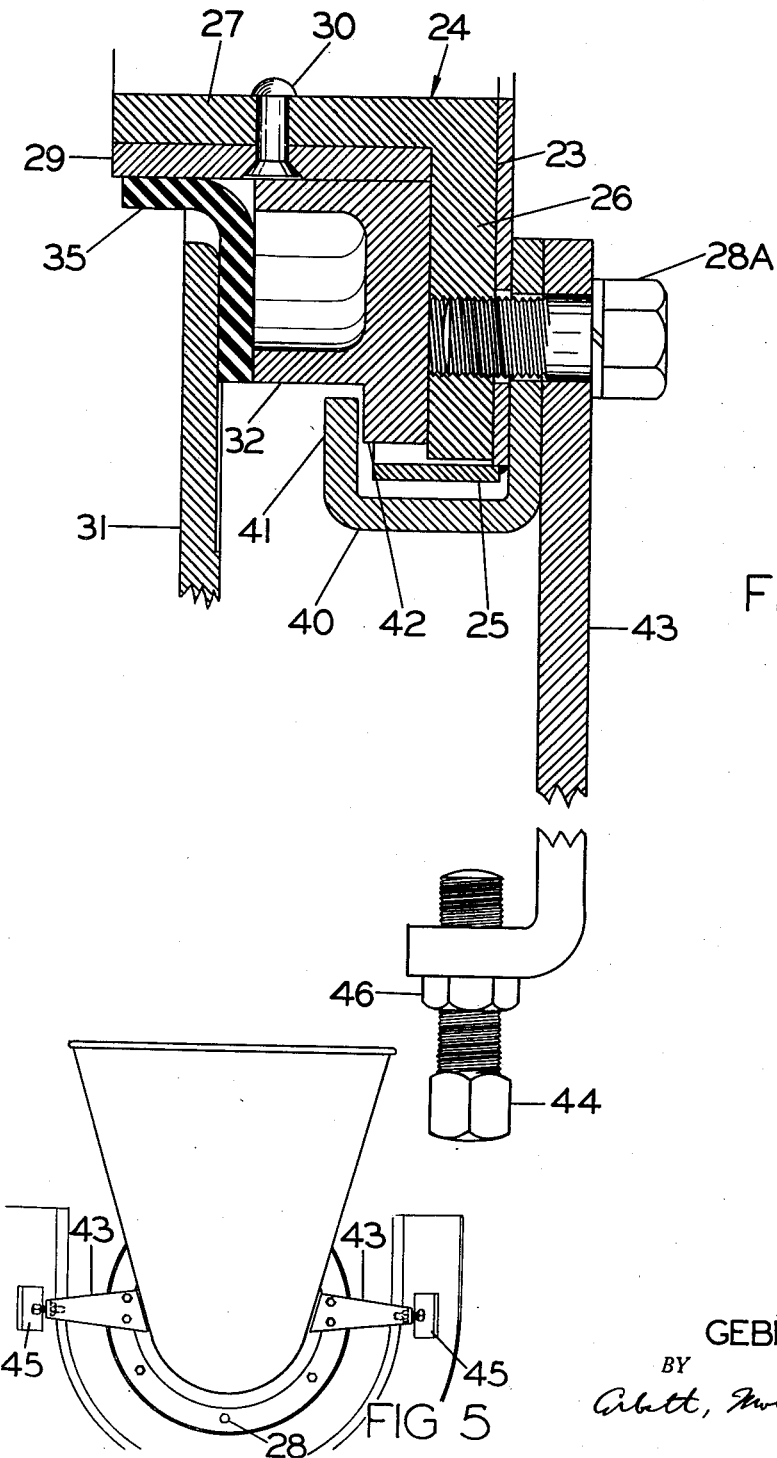
INVENTOR.
GEBHARD JAEGER Patented Nov. 6, 1951

2,574,184

UNITED STATES PATENT OFFICE 2,574,184

SEALING MEANS FOR AN END-LOADING TRANSIT MIXER OR AGITATOR

Gebhard Jaeger, Columbus, Ohio, assignor to The Jaeger Machine Company, Columbus, Ohio, a corporation of Ohio Application June 1, 1951, Serial No. 229,337

14 Claims. (Cl. 259—161)

My invention relates to sealing means for an end-loading transit mixer or agitator. It has to do, more particularly, with sealing means provided between the rotating and non-rotating members of the charging and discharging unit which is mounted at the open upper end of the inclined drum of a transit mixer or agitator of the high-dump type.

This invention deals with that type of mixer or agitator wherein the charging and discharging unit comprises a loading hopper mounted for movement between a charging position, where it is associated with the end opening of the drum, and a discharging position, where it is spaced from the opening. In this type of unit, an annulus or door has been provided between the inner or lower open end of the hopper and the drum opening. This annulus is connected to the lower end of the hopper by sealing means, which permits relative rotation, so that thrust pressure can be applied to the hopper to move it into charging position where the annulus will seat around the drum opening and will be pressed so firmly thereagainst that it will rotate with the drum. An effective seal must be provided between the outer or upper end of the relatively rotatable annulus and the inner or lower end of the hopper.

One of the objects of my invention is to provide sealing means, including a flexible sealing member, between the relatively rotatable annulus and hopper which is so designed that there will be little danger of abrasive materials, from the mix in the drum, working between the relatively rotatable sealing surfaces and which is so designed that even though the thrust force, for seating the annulus or door around the drum opening, is applied through the sealing means, there will be no compression on the flexible sealing member which will eliminate the necessity of frequent removal and replacement of such flexible member.

Another object of my invention is to provide sealing means which is so designed that replacement of any parts which might eventually wear is facilitated so that replacement of the entire hopper assembly is avoided.

Another object of my invention is to provide sealing means of the type indicated wherein the flexible sealing member is so mounted that minor variations in the relative positions of the relatively rotatable parts of the sealing means will not destroy the effectiveness of the seal.

Still another object of my invention is to provide guiding means in association with the hopper and door to guide the door into sealing position around the mixer opening even if the mixer is tilted to one side or the other.

Various other objects will be apparent.

The preferred embodiment of my invention is illustrated in the accompanying drawings wherein similar characters of reference designate corresponding parts and wherein:

Figure 1 is a side elevational view illustrating my sealing means applied to a transit mixer of the high-dump type.

Figure 2 is a front perspective view showing the hopper and the rings which are to be mounted thereon, the rings being shown in disassembled spaced relationship relative thereto.

Figure 3 is an enlarged vertical sectional view taken along line 3—3 of Figure 1.

Figure 4 is an enlarged horizontal sectional view taken along line 4—4 of Figure 1.

Figure 5 is a rear end view of the hopper and associated parts.

With reference to the drawings, in Figure 1, I have illustrated generally my sealing means in association with a mixer of the high-dump type. The mixer includes the rotatable mixing drum 10 which is disposed in rearwardly and upwardly inclined position on a suitable frame, a portion of which is indicated by the numeral 11. The hopper 12 is carried at the rear or upper end of the drum 10 by means of an upstanding portion 13 of the frame to which the hopper is pivoted at 14. The mixer drum 10 is provided with the usual opening 15 at its rear or upper end through which material may pass. A ring 16 (Figure 3) is fixed around the opening and is provided with an inclined door seat 17. The hopper 12 is swung from the position shown in Figure 1, in full lines, to the position shown in dotted lines by means of an actuating unit 18 which is connected to the rear side of the hopper pivotally at 19 and to a depending portion 20 of the frame by a pivot connection 21. The details of this actuating unit 18 will not be described herein since they do not form a part of the present invention. This arrangement could be the same as that described in the patent of Yantes et al., No. 2,563,770, dated August 7, 1951.

The forward or lower side of the hopper 12 is provided with a circular opening 22, as shown in Figure 2, through which the material may pass, it being understood that this opening will be coaxial with the opening 15 of the drum 10. This opening 22 has a hopper ring assembly associated therewith in a manner now to be described. Around the opening 22 is a flat seat 23 (Figure 2)

upon which the hopper thrust ring 24 is to be seated, as shown in Figures 3 and 4. This flat seat 23 has a forwardly projecting dust ring 25 welded or otherwise secured in position around the seat. The ring 24 is provided with the flat or radial flange 26, adapted to seat on the flat seat 23, and the forwardly projecting axial flange 27 at the inner edge of the radial flange 26, it being understood that the two flanges 26 and 27 are formed integral. The ring 24 is held on the seat 23 by means of a plurality of angularly spaced bolts 28 (Figures 3 and 5) which extend forwardly through the seat 23 and into the flange 26 but terminate short of its inner face. Thus, the thrust ring 24 is removably carried by the hopper. Mounted on the interior of the axially extending flange 27 is a wearing ring 29 which is shown best in Figures 2 and 3. This ring slips snugly within the flange 27 and may be secured thereto by means of rivets 30 (Figure 4) which pass through the flange 27 and ring 29, the rivets being counter-sunk in the inner surface of the wearing ring 29. The ring 24 along with the ring 29 can be removed from the hopper, merely by removing bolts 28, and, whenever necessary, the wearing ring 29 can be removed from the ring 23 merely by cutting the rivets 30. The parts of my sealing means so far described are carried by the hopper 12 which does not rotate, it being understood that the drum 10 rotates relative to the hopper.

Around the hopper opening 22, an annulus or door 31 is provided, as shown in Figures 1 and 3. The outer edge of this door is adapted to seat against the door seat 17, around the drum opening 15, when the hopper 12 is swung to its forwardmost position. At this time, the door 31 must be permitted to rotate relative to the hopper 12, which carries it, since the door will rotate with the drum 10. Therefore, suitable sealing means must be provided between the door and the hopper to permit this relative rotation. The rings 24 and 29, previously described, form a part of this sealing means.

The sealing means also includes a door ring assembly that comprises a thrust ring 32 (Figures 3 and 4) which is secured to the inner edge of the door 31 adjacent its central opening. The ring 32 is clamped to the door 31 by means of a plurality of angularly spaced bolts 33, as shown in Figure 3, it being noted that the heads of the bolts are recessed in sockets 34 provided in the rear face of the ring 32. Between the forward flat surface of ring 32 and the rear flat surface of door 31, a flexible sealing ring 35 is clamped. This ring may be made of rubber or other suitable flexible material.

When the entire structure is assembled, the thrust ring 32 has its flat rear surface engaging the forward flat surface of the flange 26 of the thrust ring 24. It will be noted that the dust ring 25 will extend forwardly beyond the contacting flat thrust surfaces and will prevent entrance of material between such surfaces. In mounting the door ring assembly on the hopper ring assembly, the thrust ring 32 is slipped over the wearing ring 29 and moved axially until it contacts with the flange 26 of ring 24, as indicated. It will be noted that the flexible sealing ring 35, before assembly, will extend inwardly beyond the wearing ring 29. Therefore, as ring 32 is moved over ring 29, the flexible ring 35 will be bent forwardly, as shown in Figures 3 and 4. Consequently, one of the flat sides 36 of the ring 35 will bear against the axial wearing ring 29.

It will be noted too that the flexible ring 35 is thus turned towards the drum opening which will result in a better seal and prevent grout material, from the drum, working between the flexible ring 35 and the wearing ring 29.

It will be apparent that the door 31, flexible ring 35, and thrust ring 32 are clamped together as a unit and that this unit will rotate with the drum relative to the hopper, the ring 32 rotating on the axial wearing ring 29. To provide lubricant between the various sealing surfaces, suitable grease gun fittings 37 (Figure 3) are provided through which lubricant is supplied under pressure to passageways 38, formed in the flange 27 of ring 24. Openings 39, in wearing ring 29, permit this grease to reach the contacting thrust surfaces of ring 32 and flange 26 and to reach the contacting surface of wearing ring 29 and surface 36 of flexible ring 35. This lubricant under pressure also aids in preventing the entrance of abrasive materials between the contacting sealing surfaces.

To hold the door ring assembly on the hopper ring assembly, the retaining lugs 40 are provided. These lugs are secured to the hopper by means of bolts 28a (Figure 4). The lugs 40 extend forwardly over the thrust ring 25 and are provided with radially inwardly extending ears 41 which extend over the peripheral flange or shoulder 42 formed on thrust ring 32. When it is desired to remove the door ring assembly, the bolts 28a are removed so as to permit removal of lugs 40. Then the door ring assembly is slipped forwardly off the hopper ring assembly. Then merely by removing bolts 33, the flexible sealing ring 35 can be removed and be replaced with a new ring, if desired.

Guide brackets 43 are attached to the hopper by means of the bolts 28a at diametrically opposed points, as shown in Figure 5. These brackets are rigidly attached to the hopper in horizontal position. The outer end of each bracket carries a radially extending adjustable bolt 44. The heads of these bolts 44 are adapted to engage the inner surfaces of guide brackets 45, which are suitably secured to the frame of the mixer at corresponding opposed points. These bolts 44 may be adjusted and be locked in position by lock nuts 46 so that the two projecting bolts on the brackets 43 will just move between brackets 45. With this arrangement, even though the mixer is tilted to one side or the other, as the hopper swings into closed position, the door 31 will be guided into proper seating position relative to the drum opening seat 17. The brackets 45 diverge towards their outer ends to facilitate movement of the heads of bolts 44 therebetween.

It will be apparent from the above description that I have provided sealing means between the relative rotatable door 31 and hopper 12 which is so designed that there will be little danger of abrasive materials working between the sealing surfaces. This is true of the contacting surfaces of the metal thrust rings 24 and 32 as well as the contacting surfaces of the flexible sealing ring 35 and wearing ring 29. The thrust rings will take the thrust required to force the door into sealing position and no compression will be placed on the flexible sealing ring 35 which will prevent undue wear on the flexible sealing ring and eliminate frequent replacement. When the flexible ring 35 does eventually wear to the extent requiring replacement, it can be replaced easily. Also, the wearing ring 29 can be removed from the ring 24 and be replaced and even the entire ring 24 can be replaced on the hopper 12 if it ever becomes necessary. Thus, it is not necessary to discard the entire hopper because of wear of the rings carried thereby. The door 31 on the hopper 12 will be guided into seating position relative to the drum opening 15 even though the hopper is tilted to one side or the other, because of the provision of the guide brackets 43 and 45.

Various other advantages will be apparent.

Having thus described my invention, what I claim is:

1. In combination with a mixer having a rotatable mixing drum with an opening through which the material is charged and discharged, a charging device including a hopper and an annular door for cooperating with said opening, means for supporting said charging device on said mixer for movement of the door into sealing association with or away from said opening, means for moving said charging device between such positions, means for mounting said door on said hopper so as to permit relative rotation, said means comprising a sealing joint which includes flat thrust rings carried by said hopper and said door member in face-to-face contact, a flexible sealing ring carried by the door remote from the contacting faces of said thrust rings, and a wearing ring carried by said hopper and extending axially of said opening, said flexible sealing ring having a free edge which is turned substantially parallel with and into contact with said axially extending wearing ring.

2. The combination of claim 1 wherein the flexible ring is turned towards said opening.

3. The combination of claim 2 wherein said wearing ring is removable.

4. The combination of claim 3 wherein both of said thrust rings are removable.

5. The combination of claim 4 wherein said flexible sealing ring is removably clamped between one of said thrust rings and the door member.

6. The combination of claim 5 wherein a dust ring surrounds the outer edges of said thrust rings.

7. The combination of claim 6 including retaining lugs carried by said hopper and extending around said thrust ring carried by the door to retain the thrust rings in cooperative relationship.

8. The combination set forth in claim 1 including guide members carried by the hopper and cooperating with fixed guide members carried by the mixer for guiding the hopper when it closes so that the door properly seats on the drum opening even if the mixer is tilted to one side or the other.

9. In combination with a mixer having a rotatable mixing drum with an opening through which the material is charged and discharged, a charging device including a hopper and an annular door ahead of the hopper for cooperating with said opening, means for supporting said charging device on said mixer for movement of the door into sealing association with or away from said opening, means for moving said charging device between such positions, means for mounting said door on the forward part of said hopper so as to permit relative rotation, said means comprising a sealing joint which includes a flat thrust ring carried by the forward part of said hopper and a flat thrust ring carried by said door at the rear side thereof and which are in face-to-face contact, a flexible sealing ring clamped between said door and said thrust ring carried thereby and having a free edge extending inwardly towards the axis of the door, and a wearing ring carried by said hopper and extending axially within the door, the free end of said flexible ring extending into contact with said wearing ring and being turned axially thereof.

10. The combination of claim 9 wherein the ring is turned towards the opening in the drum.

11. The combination of claim 10 wherein said wearing ring is removably attached to the hopper.

12. The combination of claim 11 wherein the first thrust ring is removably attached to the hopper and the second thrust ring is removably attached to the door.

13. The combination of claim 12 wherein the attachment of the first ring to the door is by bolts passing through such ring and having their heads recessed in the flat faces thereof.

14. The combination of claim 13 wherein the second ring is attached to the hopper by bolts, and retaining lugs also attached to the hopper by said bolts, said lugs extending over the first thrust ring which is attached to said door.

GEBHARD JAEGER.

REFERENCES CITED

The following references are of record in the file of this patent:

UNITED STATES PATENTS

| Number | Name | Date |
| --- | --- | --- |
| 2,360,345 | Hilkemeier | Oct. 17, 1944 |
| 2,374,912 | Barnes | May 1, 1945 |
| 2,476,023 | Bohannan | July 12, 1949 |
| 2,489,885 | Henderson et al. | Nov. 29, 1949 |
| 2,504,223 | Pasquariello | Apr. 18, 1950 |
| 2,545,485 | Meisenburg | Mar. 20, 1951 |